United States Patent [19]

Pana et al.

[11] Patent Number: 4,993,258
[45] Date of Patent: Feb. 19, 1991

[54] TEST BENCH FOR VEHICLES

[75] Inventors: Constantin Pana, Mannheim; Hans-Walter Weyland, Kallstadt, both of Fed. Rep. of Germany

[73] Assignee: Asea Brown Boveri Aktiengesellschaft, Mannheim, Fed. Rep. of Germany

[21] Appl. No.: 511,623

[22] Filed: Apr. 20, 1990

[30] Foreign Application Priority Data

Apr. 22, 1989 [DE] Fed. Rep. of Germany ....... 3913345

[51] Int. Cl.$^5$ .......................................... G01M 19/00
[52] U.S. Cl. ................................................ 73/118.1
[58] Field of Search .......................... 73/117, 123, 126

[56] References Cited

U.S. PATENT DOCUMENTS 3,354,707 11/1967 Born ...................................... 73/117

Primary Examiner—Jerry W. Myracle
Attorney, Agent, or Firm—Herbert L. Lerner; Laurence A. Greenberg

[57] ABSTRACT

A test bench for vehicles includes a testing zone for testing vehicles, and a preparation zone separate from the testing zone. The preparation zone includes a lifting platform, an air cushion transport system, and an air drive system for driving the air cushion transport system into the testing zone with the vehicle prepared for testing.

5 Claims, 2 Drawing Sheets

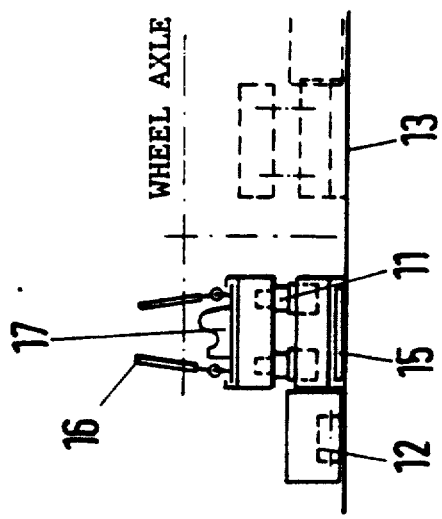
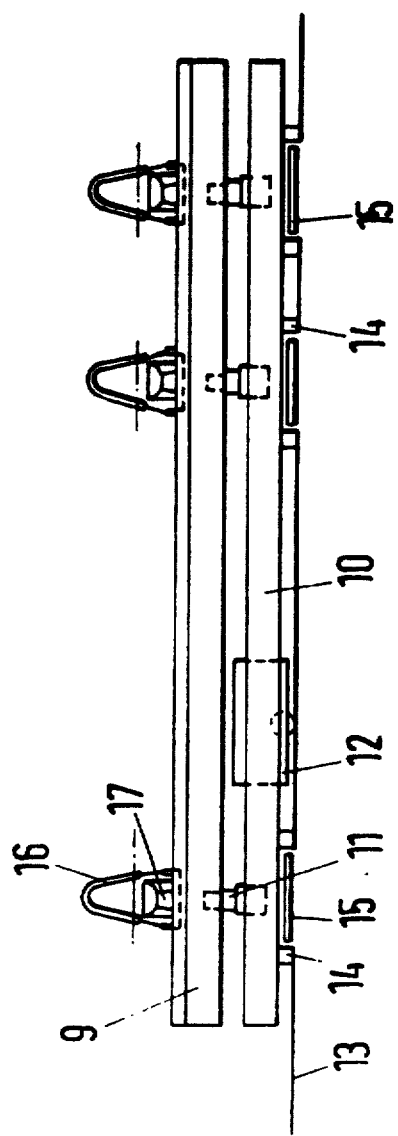

TEST BENCH FOR VEHICLES

The invention relates to a test bench for vehicles.

A vehicle test bench is used as a substitute for test tracks, because the full vehicle power cannot be brought to bear on test tracks and special driving situations cannot be repeated at will, due to external factors. Program-controlled test benches with an electronic regulating and simulation system, simulate a dynamic load which is true to actual conditions, is faithful to practically all driving conditions and makes it possible to simulate all driving situations exactly and to repeat them at any time. Since test tracks are very expensive, because of the acquisition of land and due to maintenance and environmental burdens, test benches are being used more and more.

A test bench for vehicles is formed of a testing zone that is enclosed on all sides and into which the test vehicle is pushed. Cardan shafts and adaptor gears connect the driven wheel hubs of the test vehicle to electric motors, which can both drive and brake. Driving conditions of the kind that occur in actual driving can be simulated with these motors. The number of electric motors and therefore the number of driven wheel hubs or vehicle axles is arbitrary and can be expanded at any time. The adaptor gears are provided in order to coordinate the drive and braking moments between the electric motors and the test vehicle, so that not only passenger vehicles, trucks and vehicles that travel on rails, but also tanks can all be tested on the same test bench.

Before the actual test operation can begin, the test vehicle must be suitably prepared. To this end, it is hoisted with a lifting platform, so that the wheels can be removed. Then the test vehicle is adjusted to such dimensional accuracy that the position of the wheel hubs matches the cardan shaft of the test bench. This vertical and lateral adjustment is carried out with special equipment. Adaptor flanges must also be used. Moreover, the test vehicle must be tied down, or in other words rigidly attached to the supporting surface thereof, and moved into the testing zone by means of a transport system.

These preparatory operations often take longer than the actual testing process, making for a poor cost-to-benefit ratio in the known vehicle test benches.

It is accordingly an object of the invention to provide a test bench for vehicles, which overcomes the hereinaforementioned disadvantages of the heretofore-known devices of this general type and which reduces the high test bench costs by shortening the preparation time for the test vehicle.

With the foregoing and other objects in view there is provided, in accordance with the invention, a test bench for vehicles, comprising a testing zone for testing vehicles, and a preparation zone separate from the testing zone, the preparation zone including a lifting platform, an air cushion transport system, and an air drive system for driving the air cushion transport system into the testing zone with the vehicle prepared for testing.

In accordance with another feature of the invention, the air cushion transport system has two identical halves, each of the halves including a lower driving part with air cushions for lifting the lower driving part, and an upper mounting plate for receiving the vehicle being, the upper mounting plate having lifting cylinders for varying the height of the upper mounting plate.

In accordance with a further feature of the invention, the air drive system includes two air drives each being associated with the lower driving part at a respective side of the vehicle.

In accordance with an added feature of the invention, the upper mounting plate includes chucking blocks equal in number to the number of wheel hubs of the vehicle, and a clamping and shackling system for positioning the wheel hubs of the vehicle.

In accordance with a concomitant feature of the invention, there are provided spacer elements spacing the lower driving part from the ground.

One particular advantage of the test bench according to the invention is the considerable savings of time in the overall test process. While one vehicle to be tested is still being tested in the testing zone, the next vehicle is mounted in the preparation zone. Once the test operation has ended, the tested vehicle is driven out of the testing zone by means of air cushions, and the new test specimen is driven in. Accordingly, the testing and preparation phases run in parallel, resulting in considerable savings.

The use of an air cushion transport system to drive the test vehicle into and out of the testing shop has the further advantage of permitting even very large vehicles, such as tanks weighing up to 60 tons, to be moved comparatively easily and simply, and of being able to be adapted to the couplings of the cardan shafts very quickly, accurately and symmetrically even during the initial setting of the testing zone. Since the test vehicle is supported on an air cushion which is only a few millimeters in height, there are no further frictional forces involved, and sliding and rotary motions can be executed in a simple manner.

Another advantage of the test bench according to the invention is that vehicles driven with tracks, wheels, or on rails can be tested therewith. The number of axles of the test vehicle is arbitrary. In simple test benches, it is sufficient to check just one driven axle. However, the testing zone and preparation zone of the test bench can be expanded enough to accommodate up to six driven axles. In the testing zone, the mutual spacing of the axles is also variable, so that any type of vehicle can be studied in the test bench.

Other features which are considered as characteristic for the invention are set forth in the appended claims.

Although the invention is illustrated and described herein as embodied in a test bench for vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 2a is a side-elevational view of the air cushion transport system of FIG. 1 with the mounting plate and the operating part thereof; and FIG. 2b is a front-elevational view of one-half of the air cushion transport system.

Figure 1:
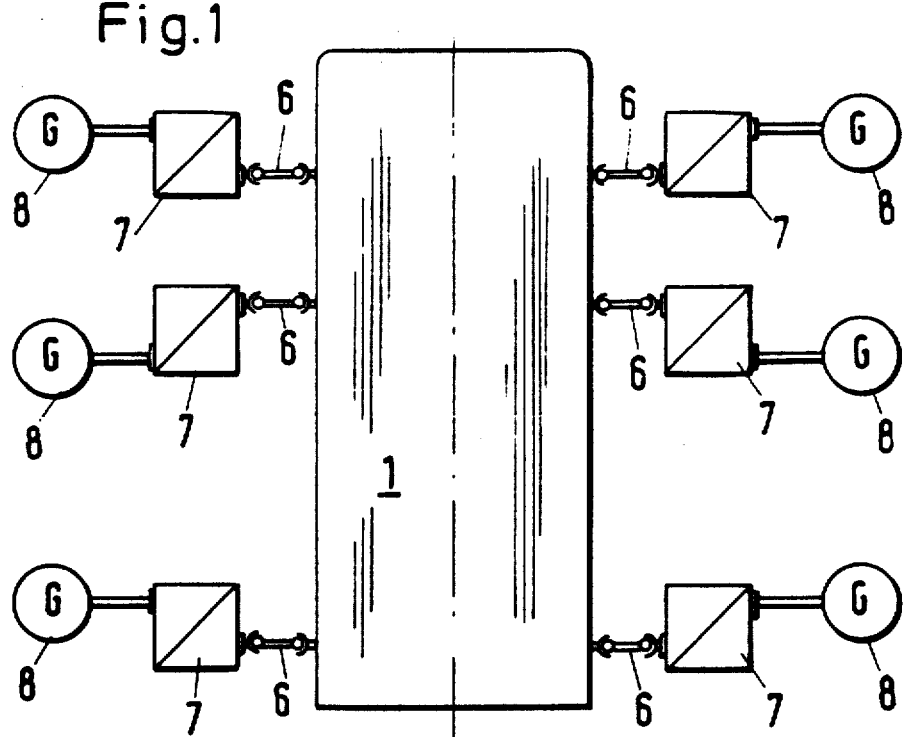
FIG. 1 is a diagrammatic, plan view of a test bench for vehicles according to the invention, including a testing zone and a preparation zone with a lifting platform and an air cushion transport system.
Figure 1:
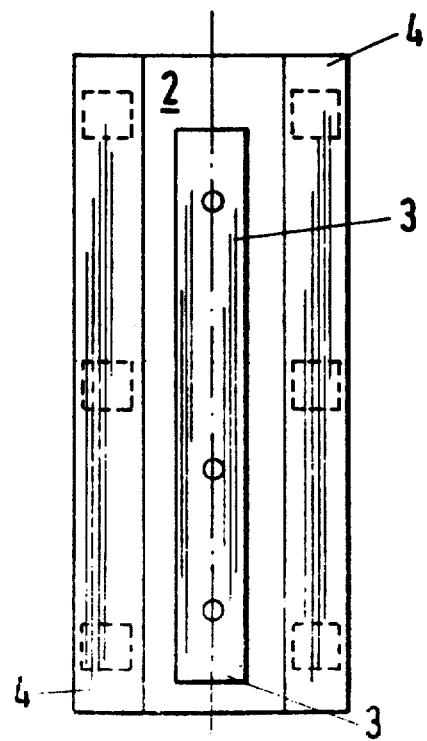

Referring now to the figures of the drawing in detail and first, particularly, to FIG. 1 thereof, there is seen a vehicle test bench which is formed of a testing zone 1 and a preparation zone 2. The vehicle test bench is disposed in a shop or building with a solid surface or solid ground under it. A lifting platform 3 and an air cushion transport system 4 are located in the preparation zone 2.

In the preparation zone 2, the vehicle to be tested is prepared for later testing in the testing zone 1 and is driven into the testing zone 1 by the air cushion transport system 4. In the testing zone 1, the axles of the non-illustrated test vehicle are coupled to cardan shafts 6. In FIG. 1, the option of testing for a three-axle vehicle has been shown. The axles of the vehicle are attached through the cardan shafts 6 and differential gears 7 to electric motors 8 of an electronic regulating and simulation system. Naturally, vehicles with a different number of axles can also be tested.

As a rule, the non-illustrated test vehicle drives under its on power onto the lifting platform 3 in the preparation zone 2, where it is hoisted hydraulically. Then the wheels are loosened and removed with a non-illustrated wheel dismounting machine. Then the air cushion transport system 4 is slid under the hoisted wheel hubs of the test vehicle, so that the hoist can be retracted again.

As shown in FIG. 2a, the air cushion transport system 4 is formed of an upper mounting plate 9 for receiving the test vehicle and a lower driving part 10 having the actual air cushion transport device.

The mounting plate 9 is adjustable in height relative to the lower driving part 10 through lifting cylinders 11. Disposed on the lower driving part 10 of the air cushion transport system 4 are compressed-air drives 12 of a driven roller drive system. The compressed-air drives 12 serve to provide sliding and rotational motion of the air cushion transport system 4. In principle, one pair of compressed-air drives 12 is provided for each test vehicle. The compressed-air drives 12 are predominantly disposed on the outside of the driving part 10. In the drawing, only one compressed-air drive has been shown, for the sake of simplicity.

The compressed-air drive 12 is accordingly provided for actually driving the test vehicle out of the preparation zone 2 into the testing zone 1, while the lifting of the entire configuration is effected by means of air cushions 15 located underneath the driving part 10, in combination with spacer elements 14. The air cushions 15 are predominantly disposed under each axle of the test vehicle.

The spacer elements 14 are provided under the driving part 10 in order to assure that the air cushions 15 of the driving part 10 will not press onto the surface or ground 13 in the state of repose. Such air cushion systems are well known, so that they have not been shown in detail in the drawing.

Chucking blocks 17 are also provided on the mounting plate 9 of the air cushion transport system, and the axles of the test vehicle are disposed thereon. Each axle of the test vehicle is supported on two chucking blocks 17. The wheel suspension of the test vehicle is shackled and positioned with clamping belts 16, which are located above the chucking blocks 17.

Only half the air cushion transport system has been shown in the front view of FIG. 2b, for the sake of simplicity. The other half has been merely suggested in broken lines. It can be clearly seen that the air cushion transport system is formed of two identical halves. Each half is formed of a driving part 10 and a mounting plate 9 with the associated chucking blocks 17 and clamping belts 16. Each half also has its own compressed air drive 12 and air cushions 15. In FIG. 2b, the wheel axle and the middle of the test vehicle have also been shown in phantom.

The two halves are connected to one another by means of the test vehicle, which is secured on the chucking blocks 17. The air cushion transport system, with the test vehicle clamped in place, can then be moved into the testing zone 1 by means of the compressed air drives. However, it is also possible for the air cushion transport system to be formed of a single part, or in other words for the two identical halves to be rigidly joined together.

The shackling of the test vehicle is effected, for instance, by means of the clamping belts 16 or ropes, which are secured on the chucking blocks 17 of the mounting plate 9 of the air cushion transport system 4 and are pulled over the wheel suspensions or axles of the removed vehicle wheels in such a way that a fixed, correct position of the wheel hubs on the mounting plate 9 is assured.

Through the use of the hydraulic cylinders 11 between the mounting plate 9 and the driving part 10 of the air cushion transport system 4, an adaptation to the expected height of the cardan shaft 6 in the testing zone 1 can be attained.

Thus the test bench according to the invention is operated in such a way that the wheels of the vehicle are dismounted in the separate preparation zone 2, and the test vehicle is made ready for coupling to the cardan shafts 6 of the testing zone 1. Once the correct positions of the wheel hubs of the test vehicle have been achieved in the preparation zone 2, the test vehicle is driven into the testing zone 1 by simple displacement by means of the air cushion transport system 4 and there the vehicle is coupled to the cardan shafts 6 through non-illustrated adaptor flanges. Testing of the vehicle can begin while another test specimen is being prepared in the preparation zone 2 for the next test.

We claim:

1. Test bench for vehicles, comprising a testing zone for testing vehicles, and a preparation zone separate from said testing zone, said preparation zone including a lifting platform, an air cushion transport system, and an air drive system for driving said air cushion transport system into said testing zone with the vehicle prepared for testing.

2. Test bench according to claim 1, wherein said air cushion transport system has two identical halves, each of said halves including a lower driving part with air cushions for lifting said lower driving part, and an upper mounting plate for receiving the vehicle being, said upper mounting plate having lifting cylinders for varying the height of said upper mounting plate.

3. Test bench according to claim 2, wherein said air drive system includes two air drives each being being associated with said lower driving part at a respective side of the vehicle.

4. Test bench according to claim 2, wherein said upper mounting plate includes chucking blocks equal in number to the number of wheel hubs of the vehicle, and a clamping and shackling system for positioning the wheel hubs of the vehicle.

5. Test bench according to claim 2, including spacer elements spacing said lower driving part from the ground.

* * * * *